US012087248B2

(12) United States Patent
Taylor

(10) Patent No.: US 12,087,248 B2
(45) Date of Patent: Sep. 10, 2024

(54) SYSTEMS AND METHODS FOR LOW POWER COMMON ELECTRODE VOLTAGE GENERATION FOR DISPLAYS

(71) Applicant: Snap Inc., Santa Monica, CA (US)

(72) Inventor: Stewart S. Taylor, Beaverton, OR (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/450,811

(22) Filed: Aug. 16, 2023

(65) Prior Publication Data

US 2023/0395037 A1 Dec. 7, 2023

Related U.S. Application Data

(63) Continuation of application No. 17/991,508, filed on Nov. 21, 2022, now Pat. No. 11,776,501, which is a (Continued)

(51) Int. Cl.
*G09G 3/36* (2006.01)

(52) U.S. Cl.
CPC ... *G09G 3/3696* (2013.01); *G09G 2310/0291* (2013.01); *G09G 2310/08* (2013.01)

(58) Field of Classification Search
None
See application file for complete search history.

(56) References Cited

U.S. PATENT DOCUMENTS 11,580,927 B2 2/2023 Taylor
2008/0174285 A1* 7/2008 Morita ................ G09G 3/3655 345/204

(Continued)

FOREIGN PATENT DOCUMENTS

CN 1334555 A 2/2002
CN 101510415 A 8/2009

(Continued)

OTHER PUBLICATIONS

"U.S. Appl. No. 17/413,621, Non Final Office Action mailed Jun. 23, 2022", 11 pgs.

(Continued)

*Primary Examiner* — Christopher J Kohlman

(74) *Attorney, Agent, or Firm* — Schwegman Lundberg & Woessner, P.A.

(57) ABSTRACT

A system, circuit, and method for implementing a low power common electrode voltage for a display (e.g., LcoS display) having transistors with low to moderate breakdown voltages may include a first and a second low voltage amplifier, wherein the first amplifier generates a pixel voltage and the second amplifier generates a predetermined voltage. The circuit may include a common electrode circuit coupled to the first and second amplifier to generate a common electrode voltage. Particularly, the circuit may include a control circuit coupled to the common electrode circuit, wherein, during a first phase, the control circuit selectively controls the common electrode circuit to generate a low common electrode voltage based upon a negative value of the predetermined voltage. Further, during a second phase, the control circuit selectively controls the common electrode circuit to generate a high common electrode voltage based upon the sum of the predetermined voltage and the pixel voltage.

20 Claims, 6 Drawing Sheets

Related U.S. Application Data continuation of application No. 17/413,621, filed as application No. PCT/US2020/040468 on Jul. 1, 2020, now Pat. No. 11,580,927.

(60) Provisional application No. 62/869,432, filed on Jul. 1, 2019.

(56) References Cited

U.S. PATENT DOCUMENTS

| | | | |
|---|---|---|---|
| 2009/0109158 | A1 | 4/2009 | Shirai |
| 2010/0238146 | A1 | 9/2010 | Zebedee |
| 2022/0044651 | A1 | 2/2022 | Taylor |
| 2023/0079962 | A1 | 3/2023 | Taylor |

FOREIGN PATENT DOCUMENTS

| | | | |
|---|---|---|---|
| CN | 101681594 | A | 3/2010 |
| CN | 103493123 | A | 1/2014 |
| CN | 113632160 | A | 11/2021 |
| EP | 3921828 | A1 | 12/2021 |
| JP | 2009109816 | A | 5/2009 |
| JP | 2022538510 | A | 9/2022 |
| KR | 20210149160 | A | 12/2021 |
| TW | 200629213 | A | 8/2006 |
| TW | 202105350 | A | 2/2021 |
| WO | WO-2021003253 | A1 | 1/2021 |

OTHER PUBLICATIONS

"U.S. Appl. No. 17/413,621, Notice of Allowance mailed Oct. 5, 2022", 9 pgs.

"U.S. Appl. No. 17/413,621, Preliminary Amendment filed Jun. 14, 2021", 7 pgs.

"U.S. Appl. No. 17/413,621, Response filed Sep. 22, 2022 to Non Final Office Action mailed Jun. 23, 2022", 8 pgs.

"U.S. Appl. No. 17/991,508, 312 Amendment filed Aug. 3, 2023", 7 pgs.

"U.S. Appl. No. 17/991,508, Notice of Allowance mailed May 19, 2023", 9 pgs.

"Chinese Application Serial No. 202080021698.9, Office Action mailed Aug. 19, 2022", w/ English Translation, 18 pgs.

"Chinese Application Serial No. 202080021698.9, Response filed Nov. 28, 2022 to Office Action mailed Aug. 19, 2022", w/o English Claims, 13 pgs.

"European Application Serial No. 20745387.9, Response to Communication pursuant to Rules 161(1) and 162 EPC filed Apr. 11, 2022", 14 pgs.

"International Application Serial No. PCT/US2020/040468, International Preliminary Report on Patentability mailed Jan. 13, 2022", 13 pgs.

"International Application Serial No. PCT/US2020/040468, International Search Report mailed Oct. 14, 2020", 3 pgs.

"International Application Serial No. PCT/US2020/040468, Written Opinion mailed Oct. 14, 2020", 11 pgs.

"Korean Application Serial No. 10-2021-7036379, Notice of Preliminary Rejection mailed Jun. 16, 2023", w/ English Translation, 5 pgs.

"Korean Application Serial No. 10-2021-7036379, Office Action mailed Feb. 16, 2023", w/ English Translation, 11 pgs.

"Taiwanese Application Serial No. 109122278, First Office Action mailed Jun. 2, 2023", w/o English translation, 6 pgs.

* cited by examiner

SYSTEMS AND METHODS FOR LOW POWER COMMON ELECTRODE VOLTAGE GENERATION FOR DISPLAYS

CROSS-REFERENCE TO RELATED APPLICATION

This application is a continuation of U.S. application Ser. No. 17/991,508, filed Nov. 21, 2022, which application is a continuation of U.S. application Ser. No. 17/413,621, filed Jun. 14, 2021, now issued as U.S. Pat. No. 11,580,927, which application is a U.S. National Stage Filing under 35 U.S.C. 371 from International Application No. PCT/US2020/040468, filed on Jul. 1, 2020, and published as WO2021/003253 on Jan. 7, 2021, which application claims priority to U.S. provisional application Ser. No. 62/869,432 filed on Jul. 1, 2019, all of which are incorporated herein by reference in their entirety.

BACKGROUND

In general, an LCoS display uses a liquid crystal layer on top of a silicon backplane. Most LCoS displays include a CMOS chip that controls the voltage associated with each pixel ($V_{PIX}$). These displays require a certain voltage for the common electrode to each cell. This common voltage for all the pixels is usually supplied by a transparent conductive layer made of indium tin oxide on the cover glass.

Known voltage generation circuits for generating the common electrode voltage ($V_{COM}$) employ transistors having a high breakdown voltage. As a result, the die area increases; and thereby, the cost for the circuitry increases. Many of the voltage generation circuits for generating the common electrode voltage employ transistors operating as a linear amplifier that require larger power supply voltages, which increases the power consumption. For example, some voltage generation circuits require a high voltage of approximately 9-10V. Current circuit designers implement these circuits using a large power dissipation linear amplifier, which operates at a high current (approximately 2-3 mA), where the power requirement ranges from 20 mW to 30 mW. Additionally, since conventional circuits have a high breakdown voltage, there is less opportunity for integration with other circuits or functions. Particularly, most known implementations for generating the common electrode voltage employ transistors that are not suitable for high levels of integration.

SUMMARY

Embodiments of a system, circuit, and method for implementing a low power common electrode voltage output for spatial light modulators and/or displays (e.g., LCoS displays) having transistors with low to moderate breakdown voltages are provided. It should be appreciated that the embodiments can be implemented in numerous ways, such as a process, an apparatus, a system, a device, or a method.

In some embodiments, a display system having circuitry for generating a common electrode voltage is provided. The system may include a first low voltage amplifier configured to generate a predetermined voltage for setting the common electrode voltage ($V_{COM}$) in comparison to ground/and or $V_{PIX}^-$ and a pixel voltage ($V_{PIX}$+) associated with the LCoS display. The system also includes a second low voltage amplifier configured to generate the pixel voltage $V_{PIX}^+$. Further, a common electrode circuit may be coupled to the first low voltage amplifier and the second low voltage amplifier to generate a common electrode voltage based upon the predetermined voltage and the pixel voltage. In an embodiment, one or both amplifiers are considered as part of the circuit. In particular, a control circuit may be coupled to the common electrode circuit, wherein, during a first phase, the control circuit selectively controls the common electrode circuit to generate a low common electrode voltage based upon a negative value of the predetermined voltage. Further, during a second phase, the control circuit may selectively control the common electrode circuit to generate a high common electrode voltage based upon a sum of the predetermined voltage and the pixel voltage. In an embodiment, the second phase may occur before the first phase.

In some embodiments, a method for establishing a common electrode drive voltage for an LCoS display, having transistors with lower breakdown voltage is provided. The method may include generating a predetermined voltage for setting the common electrode voltage in comparison to ground and a pixel voltage $V_{PIX}$ associated with the LCoS display. The method may further include charging, intermittently, a first capacitor and a second capacitor during a first phase and a second phase to the predetermined voltage, respectively. During the first phase, the method may further include coupling the second capacitor across a common electrode node and ground to produce a low common electrode voltage less than ground by the predetermined voltage. During a second phase, the method may further include coupling the first capacitor across a pixel voltage node and the common electrode node to produce a high common electrode voltage greater than the pixel voltage by the predetermined voltage.

In an embodiment, a display system for displaying an image comprising: a display panel having a plurality of pixels, each of the plurality of pixels having a pixel electrode voltage ($V_{PEV}$), and a common electrode voltage ($V_{COM}$); and a digital drive device coupled to the display panel comprising: a bit plane memory for providing the $V_{PEV}$ to each of the plurality of pixels; a common electrode circuit coupled to the display panel for providing the $V_{COM}$; and at least one first amplifier coupled to the display panel configured to generate a maximum pixel voltage ($V_{PIX}^+$) and a minimum pixel voltage ($V_{PIX}^-$); wherein the $V_{PEV}$ switches from $V_{PIX}^+$ to $V_{PIX}^-$ according to a voltage received by at least one of the plurality of pixels from the bit plane memory, wherein the common electrode circuit further comprises at least one second amplifier configured to generate a predetermined voltage $V_{DAC\_COM}$, and wherein a value of $V_{COM}$ switches between I) $V_{PIX}^-$ minus $V_{DAC\_COM}$; and ii) $V_{PIX}^+$ plus $V_{DAC\_COM}$.

In an embodiment, $V_{PIX+}$ has a value in the range of 1.2V-4V, and $V_{PIX}^-$ has a value in the range of 0V to −2.8V. In an embodiment, the display system of claim 1, wherein $V_{DAC\_COM}$ has a value in the range of approximately 0-2V In an embodiment, the display system of claim 1, wherein the common electrode voltage $V_{COM}$ maintains DC voltage balance across the display panel. In an embodiment, the display panel is a liquid crystal display panel.

In an embodiment, the display system further comprises a control circuit coupled to the common electrode circuit for supplying a clocking output CS to the common electrode circuit. In an embodiment, the common electrode circuit further comprises a plurality of switches that receive the clocking output CS. In an embodiment, at least one of the plurality of switches includes a plurality of MOSFET transistors. In an embodiment, the common electrode circuit is located on a separate integrated circuit chip from the display panel. In an embodiment, the common electrode circuit is integrated into the same integrated circuit chip as the display panel.

In an embodiment, $V_{PIX}^-$ is zero, and a value of $V_{COM}$ varies between less than $V_{PIX}^-$ (e.g., 0V) and greater than $V_{PIX}^+$. The embodiments herein have the advantage of enabling this $V_{COM}$ voltage swing at lower cost, lower power, smaller size and higher integration relative to known systems. In an embodiment, a method of generating a common electrode drive voltage $V_{COM}$ for a display panel having a plurality of pixels with a pixel voltage $V_{PIX}$, is provided. In an embodiment, the method comprises the steps of: coupling a common electrode circuit having at least one first capacitor and at least one second capacitor to the display panel; selectively controlling the common electrode circuit with the control circuit, during a first phase, to generate a low value of $V_{COM}$ based upon a negative value of a predetermined voltage $V_{DAC\_COM}$; and selectively controlling the common electrode circuit using the control circuit during a second phase, to generate a high value of $V_{COM}$; coupling at least one first amplifier to the display panel configured to generate a maximum pixel voltage ($V_{PIX}^+$) and a minimum pixel voltage ($V_{PIX}^-$); wherein a value of $V_{COM}$ switches between a) $V_{PIX}^-$ minus $V_{DAC\_COM}$; and ii) $V_{PIX}^+$ plus $V_{DAC\_COM}$. In an embodiment, the method further comprises the step of charging the at least one first capacitor and the at least one second capacitor within the common electrode circuit to the predetermined voltage $V_{DAC\_COM}$.

In an embodiment, the method further comprises the step of coupling at least one second amplifier to the common electrode circuit configured to generate the predetermined voltage $V_{DAC\_COM}$. In an embodiment, $V_{PIX}^+$ has a value in the range of 1.2V-4V, and $V_{PIX}^-$ has a value in the range of 0V to −2.8V. In an embodiment, $V_{DAC\_COM}$ has a value in the range of 0-2V. In an embodiment, a value of $V_{COM}$ maintains DC voltage balance across the display panel (i.e. 0V). In an embodiment, the display system is an LCoS display system.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

DETAILED DESCRIPTION

Figure 1:
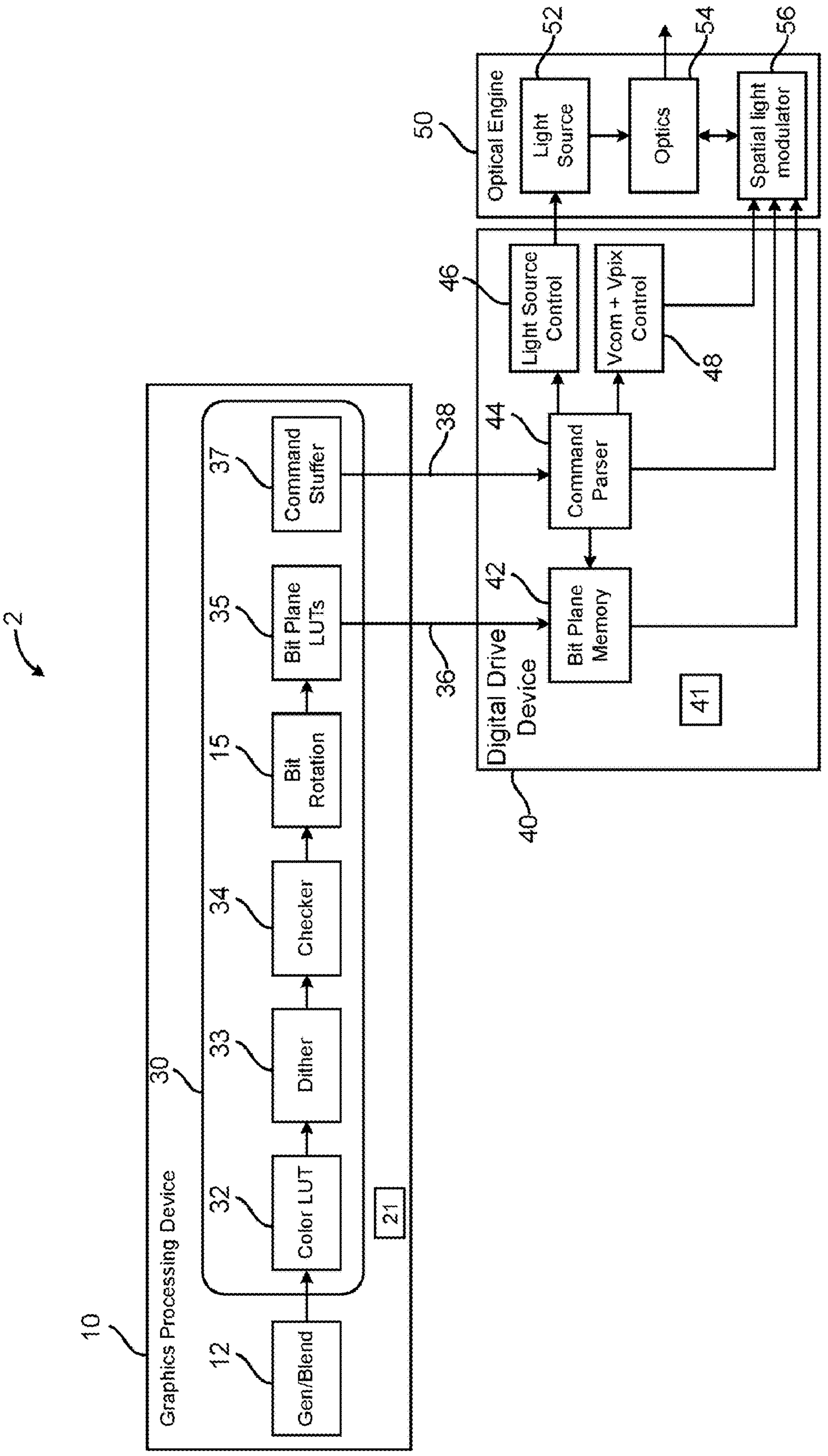
FIG. 1 is a block diagram of a display system in accordance with an embodiment of the present invention.

The following embodiments describe a display system (e.g., LCoS display system), associated circuitry, and method for common electrode voltage generation. It can be appreciated by one skilled in the art, that the embodiments may be practiced without some or all of these specific details. In other instances, well known process operations have not been described in detail in order not to unnecessarily obscure the embodiments.

In some embodiments, the display system is an LCoS display system and may include a circuit for common electrode voltage $V_{COM}$ generation having a first low voltage amplifier configured to generate a predetermined voltage to be implemented for setting the common electrode voltage $V_{COM}$ to a value relative to ground and to the pixel voltage $V_{PIX}$ associated with the LCoS display. The system also includes a second low voltage amplifier configured to generate the pixel voltage $V_{PIX}$. Further, a common electrode circuit may be coupled to the first low voltage amplifier and the second low voltage amplifier to generate a common electrode voltage based upon the predetermined voltage and the pixel voltage $V_{PIX}$. In particular, a control circuit may be coupled to the common electrode circuit, wherein, during a first phase, the control circuit selectively controls the common electrode circuit to generate a low common electrode voltage based upon a negative value of the predetermined voltage. Further, during a second phase, the control circuit may selectively control the common electrode circuit to generate a high common electrode voltage based upon a sum of the predetermined voltage and the pixel voltage $V_{PIX}$. The common electrode voltage $V_{COM}$ generated according to the embodiments herein maintain a voltage (e.g. DC voltage) balance of approximately 0V across the liquid crystal display panel of the LCoS display systems of the present invention.

The method of generating the common electrode voltage $V_{COM}$ may include generating the predetermined voltage relative to the pixel voltage $V_{PIX}$ associated with the LCoS display and charging, intermittently, a first capacitor and a second capacitor during a first phase and a second phase to the predetermined voltage, respectively. In particular, during the first phase, the method can include coupling the second capacitor across a common electrode node and ground to produce a low common electrode voltage that is less than ground by the predetermined voltage. During a second phase, the method may further include coupling the first capacitor across a pixel voltage node and the common electrode node to produce a high common electrode voltage that is greater than the pixel voltage $V_{PIX}$ by the predetermined voltage.

Advantageously, the system, circuit, and method of implementing a low power common electrode voltage described herein can be used for the implementation of the common electrode voltage, $V_{COM}$, for LCoS imagers/back planes employing transistors having lower breakdown voltage than those that are known and currently utilized within displays (e.g., LCoS displays). The common electrode voltage generation process and/or the common electrode circuit may be implemented on an integrated circuit, by itself, or alternatively as part of another integrated circuit, such as that of a display panel or imager. The embodiments of the present invention reduce the required breakdown voltage of the transistors needed for implementation of the common electrode drive voltage relative to known systems. The common electrode voltage generation circuit and method described herein also lowers the cost of the circuitry implementation due to the reduced die size required. Further, the system and method disclosed herein may increase the level of integration when integrated on the same die as the LCoS backplane/display. In an embodiment the $V_{COM}$ circuit is integrated on a separate die from the display or integrated with other analog functions (e.g., temperature sensing, optical feedback etc.). As such, the $V_{COM}$ generation circuit (all or portions of which may be referred to herein as the common electrode circuit) may be integrated with a backplane chip of the LCoS display system or alternatively located on a separate chip that is electrically connected to the backplane chip. Embodiments of a display system (e.g. LCoS display system), in accordance with the present invention, also consume less power, making it more suitable for battery operation, and thereby producing less heat. The smaller supply voltage results in lower power dissipation. In an embodiment of the present invention, the power dissipation is reduced by employing an amplifier that runs from a power supply voltage that is approximately half or less than a value of approximately 9-10V. Prior art circuitry typically dissipates approximately 25 mW, while some embodiments of the present invention have the benefit and advantage of dissipating only approximately 5 mW.

In the following description, numerous details are set forth. It will be apparent, however, to one skilled in the art that the present invention may be practiced without these specific details. In some instances, well-known structures and devices are shown in block diagram form, rather than in detail, in order to avoid obscuring the present invention.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

Referring to FIG. 1, a block diagram of an embodiment of an LCoS display system 2 according to the present invention is provided. As illustrated, the display system 2 in accordance with the present invention, may include, the graphics processing device 10 coupled to a digital drive device 40, and an optical engine 50, coupled to the digital drive device 40. In an embodiment, the graphics processing device 10 may include a generator and blender (gen/blend) module 12. The gen/blend module 12 may generate and/or blend objects. For example, in mixed reality and immersive augmented reality applications, the blender 12 may blend generated objects with images obtained via a camera or other visual representations of objects (e.g., real objects). The gen/blend module 12 produces data, for example, video and/or image data output. In embodiments of the present invention, the gen/blend module 12 produces data, for example, video and/or image data output in alternative realities systems, devices or methods, (e.g., AR, VR, and/or MR). In an embodiment of the present invention, the gen/blend module 12 produces AR images, for example, at a head-mounted display (HMD) system input, (e.g., RGB) video frames. In embodiment of the present invention, the gen/blend module 12 may be incorporated into a drive or system that generates images (e.g., AR image), for example HMD devices or system. In some cases, the generated images may be blended with images from a camera.

In an embodiment of the present invention, the graphics processing device 10 includes a processor 30, or is associated with a processor 30. The processor 30 may be internal or external to the graphics processing device 10. In an embodiment of the present invention, the processor 30 may execute software modules, programs or instructions of the graphics processing device 10. For example, the processor 30 may execute software modules such as a dither module 33, a checkboard module 34, and a command stiffer 37. In execution of the aforementioned modules, the processor 30 may access data stored on one or more look-up tables (LUTs) (e.g., a color LUT 32 and a bit plane LUT 35). While illustrated as separate from the processor in FIG. 1, the color LUT 32 and the bit plane LUT 35 may be located on a memory block 21. The memory block 21 may be internal or external to the graphics processing device 10.

In an embodiment of the present invention, the spatial and temporal dither module 33, in accordance with the present invention, may be used to perceptually extend bit depth beyond the native display bit depth. The dither module 33 may be utilized, for example, in recovering fast moving scenes by exploiting high speed illumination "dithering" digital light processing (DLP) projectors. The checkerboard 34 module may perform a checkerboarding method in accordance with the present invention. It would be recognized by one of skill in the art that more or fewer modules may be executed by the processor 30 without departing from the scope of the invention.

In an embodiment of the present invention, bit rotation occurs via a bit rotation module 15. The bit rotation module 15 and associated processes may involve extracting a specific bit number, for example the most significant bit (MSB) by a processor (e.g., processor The resulting bit planes are used as the input of the bit plane and/or stored in the Bit Plane LUT(s) 35. In an embodiment of the present invention, the bit plane LUT 35 is accessed from the memory 21 of the graphics processing device 10 and the processor 30 accesses the bit plane LUT 35 (i.e., an instantaneous state of all output binary pixel electrode logic of the spatial light modulator 56, within optical engine 50, given each pixel's digital level value and the time). In an embodiment of the present invention, the processor 30 may execute a module (e.g., bit plane LUTs 35) that generates bit planes. In an embodiment of the present invention, the bit plane LUTs 35 may be located in the graphic processing device 10 as shown in FIG. 1. In another embodiment, the bit plane LUT 35 may reside in the digital drive device 40.

The digital drive device 40 receives data (e.g., commands 36, 38) from the graphics processing device 10 and arranges (e.g., compresses) the received data prior to communicating image data to the optical engine 50. The digital drive device 40 may include a memory 41 (which may be internal or external to the device and/or shared with another device). The digital drive device 40 may include various programs, for example, a command parser module 44 that, when executed by the processor 30, parses and/or processes data received by the digital drive device 40. The digital drive device 40 may include static and/or dynamic data (e.g., bit plane memory 42, command parser 44, light control source 46, etc.) In an embodiment of the present invention, the command stuffer 37 inserts commands in the video path in areas not seen by the end user. In an embodiment of the present invention, these commands control, for example, light source(s) 52 such as laser(s), drive voltages (e.g., such as $V_{COM}$ and $V_{PIX}$) directly, or indirectly via, for example, the Light Source Control module 46 and the $V_{COM}$+$V_{PIX}$ Control module 48. In an embodiment of the present invention, the Light Source Control module 46 and $V_{COM}$+$V_{PIX}$ Control module 48 may be implemented in hardware and/or software. The digital drive device 40 may be, for example, a component of a computing system, head mounted device, and/or other device utilizing an LCoS display.

In an embodiment, the digital drive device 40 also includes a command parser 44. The command parser 44 parses the commands 38 received from the command stuffer 37. In an embodiment of the present invention, a Light Source Control 46 controls the light source(s) 52 such as lasers or LEDs by controlling analog inputs (e.g., voltages or currents) via DACs, digital enable or disable controls, etc. In an embodiment, the $V_{COM}$+$V_{PIX}$ Control module 48 controls the $V_{COM}$ and $V_{PIX}$ voltages. In an embodiment of the present invention, the optical engine 50 contains the display components and all other optical devices required to complete the display system 2 illustrated in FIG. 1. In an embodiment of the present invention, this may include light source(s) 52, optics 54 (e.g., lenses, polarizers, etc.) and the spatial light modulator 56.

Figure 2A:
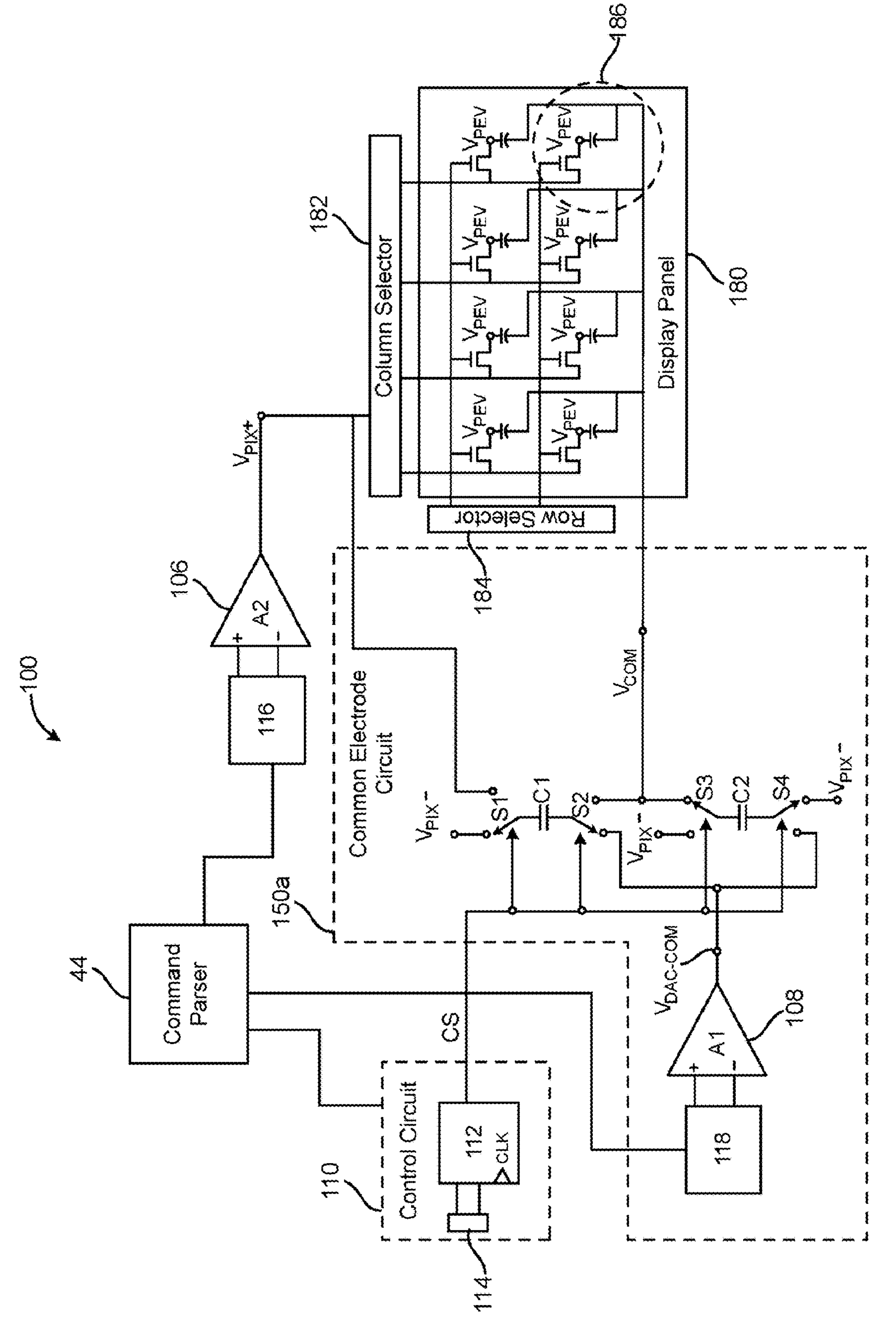
FIG. 2A is a circuit diagram of a display system including a circuit for common electrode voltage generation, in accordance with an embodiment of the present invention.
Figure 2B:
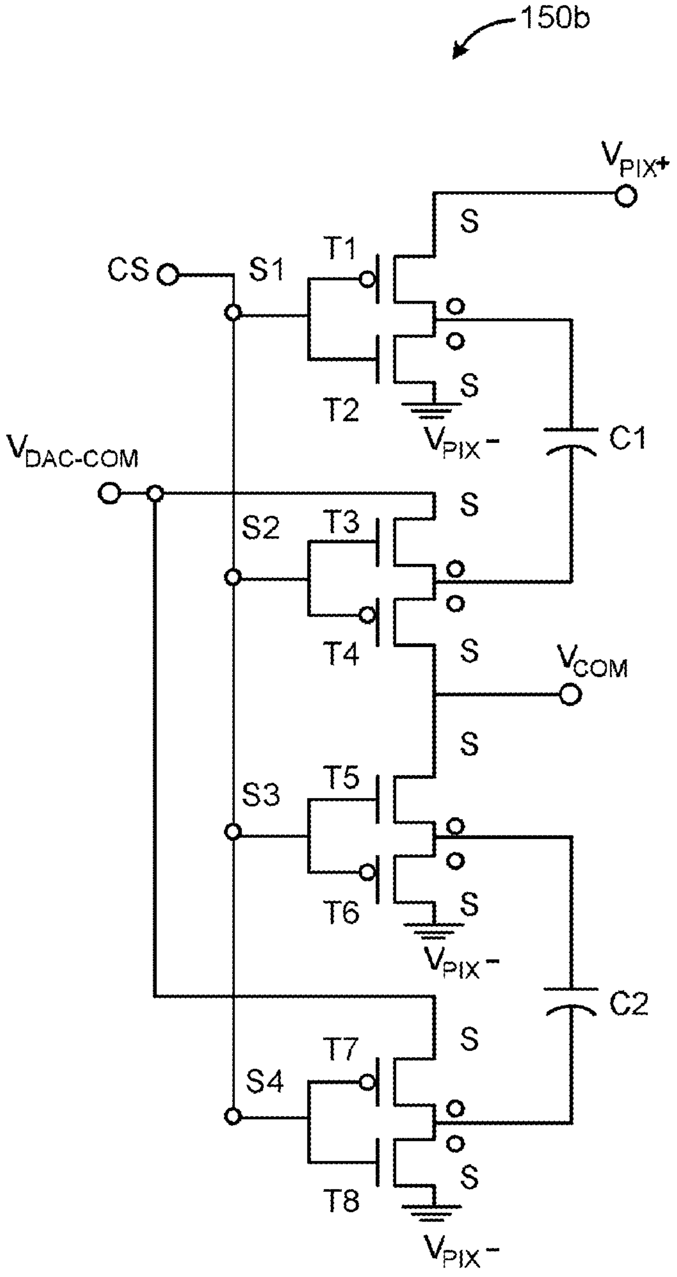
FIG. 2B is a circuit diagram of a common electrode circuit that may be used within the display system of FIG. 2A, according to an embodiment of the present invention.
Figure 3:
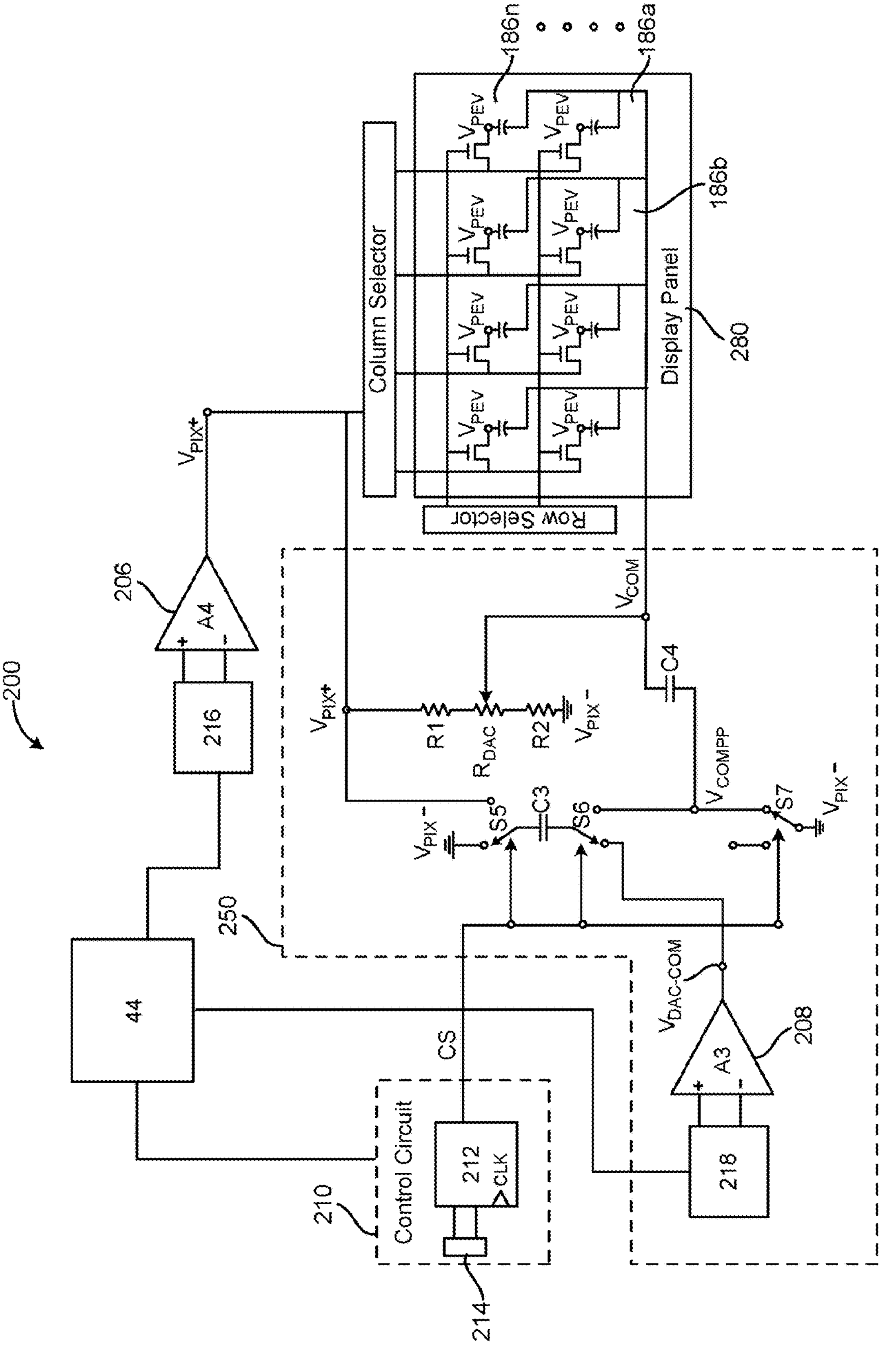
FIG. 3 is a circuit diagram of another embodiment of a display system including a circuit for common electrode voltage generation, in accordance with an embodiment of the present invention.

In an embodiment of the present invention, the control circuits 110, 210, common electrode circuits 150*a*, 150*b*, and 250, and associated amplifiers illustrated in FIGS. 2A, 2B and 3 may reside within the $V_{COM}$+$V_{PIX}$ Control module 48. The command parser 44 of FIG. 1 is connected to the component 116 (e.g. DAC), component 118 (e.g., DAC), and the control circuit 110 (and similarly components 218, 216 and control circuit 210 in FIG. 3). These components are described in further detail below. The command parser 44 sends a logic control output (e.g., digital voltage) to the components 116, 118 and the control circuit 100 in order to obtain the desired voltages produced by amplifiers 108, and 106, as well as the appropriate clocking output CS. In an embodiment, the voltages and currents sent by the command parser 44 correspond to the voltages and currents for driving the display panel 180, and ultimately determine the output intensity of a pixel of the display.

More specifically, in an embodiment, the command parser 44 provides individual voltage inputs to components 116 and 118 as well as control circuit 110. These inputs are digital control inputs (i.e., voltages, logic levels). The voltage input supplied by the command parser 44 to component 116 (e.g., DAC) represents a digital word corresponding to the desired input voltage to amplifier 106. This output of component 116 is amplified by amplifier 106 and produces voltage VPIX+. The voltage input supplied by the command parser 44 to component 118 (e.g. DAC) represents a digital word corresponding to the required input voltage to amplifier 108. The output of component 118 is amplified by amplifier 108 and produces $V_{DAC\_COM}$. The voltage input supplied by the command parser 44 to the control circuit 110 represents one or more logic level inputs that establish the frequency, duty cycle and phase of control output CS. The output of the control circuit 110 is clock output CS.

Referring to FIG. 2A, a circuit diagram of an LCoS display system 100 including circuity for generating common electrode voltage $V_{COM}$ is provided. The system 100 in FIG. 1 includes a control circuit 110 (e.g., a digital control circuit), a common electrode circuit 150*a*, and an imager and/or display panel 180 having an array of pixels that are connected to the generated $V_{COM}$. The display panel 180 also includes a column selector 182 and row selector 184. The common electrode circuit 150*a* includes, switches S1-S4 and a first low voltage amplifier 108. Amplifier 108 is connected to a component 118 (e.g., a digital to analog converter (DAC)) that produces a desired voltage output and provides it to the input of Amplifier 108. The system 100 also includes a second low voltage amplifier 106. Amplifier 106 is coupled to a component 116 (e.g., a DAC) which supplies amplifier 106 with a desired input voltage to create a predetermined $V_{PIX}$. The output of amplifier 106 is $V_{PIX+}$ (the positive value of the pixel electrode voltage $V_{PEV}$), which is connected to the common electrode circuit 150 and the display panel 180. The pixel electrode voltage $V_{PEV}$ is used to power the pixel electrodes of the pixels 186*a-n* within the display panel 180 and 280.

A pixel electrode voltage $V_{PEV}$ is a value of the pixel electrode of each of the plurality of pixels within the display panel 180. In an embodiment, the pixel electrode voltage $V_{PEV}$ switches from $V_{PIX-}$ to $V_{PIX+}$ according to the value of the data (e.g., data bit) for each pixel within the display panel 180 that is received from the bit plane memory 42 within the digital drive device 40. There is a plurality of pixels (e.g. pixel 186*a-n*) in the display panel 180 as shown in FIG. 2A and FIG. 3. (In a display system, typically, the number of pixels varies, and may be, for example, 1-8 million pixels.) The data received by each pixel 186*a-n* in the display panel 180 is received from and supplied by the bit plane memory 42 within the digital drive device 40 of FIG. 1, depending on the desired luminance or color to be displayed by a given pixel 186*a-n*. In an embodiment, the display panel 180 is located within the optical engine 50. The display panels 180, 280 in FIGS. 2A and 3 may be considered as the same component or part of the same component as the spatial light modulator 56 in FIG. 1.

The control circuit 110 may be located, for example, on an integrated circuit within a backplane chip of the display panel 180 of the system 100. Alternatively, the control circuit may be located on a separate chip that is electrically connected to the common electrode circuit 150*a*. The control circuit 110 may include an arrangement including at least one flip-flop device 112 configured to provide (e.g., transmitted via a bus) a clocked control output CS to the common electrode circuit 150*a*. In some embodiments, the control circuit 150*a* may include a flip-flop 112 coupled to a buffer 114 to provide a first and a second control output (not shown), wherein the second control output is delayed with respect to the first for the purpose of staggering the ON and OFF switching of the switches within the common electrode circuit 150*a*. Accordingly, non-overlapping control outputs (i.e., the control output CS is either on or off) may be implemented.

The second low voltage amplifier 106 may be used for generation of the pixel voltage $V_{PIX}^{+}$. The value of $V_{PIX}^{+}$ may change dynamically based upon the color sequence output from the bit plane memory 42 in conjunction with command parser 44 corresponding to the display colors and intensity of the image to be displayed by the plurality of pixels of display panel 180. In contrast, the first low voltage amplifier 108 (where "low voltage" represents amplifiers operating at, for example, approximately 5V or less) may be used to generate a voltage $V_{DAC\_COM}$. In an embodiment of the present invention, voltage $V_{DAC\_COM}$ is a predetermined voltage, that is achieved at the output by amplifier 108. The voltage input supplied to component 118 (e.g. Digital to Analog Converter (DAC) to achieve voltage $V_{DAC\_COM}$ (i.e., a voltage that will be used to establish $V_{COM}$) is obtained from the command parser 44. Voltage $V_{DAC\_COM}$ is relatively small in comparison to the pixel electrode voltage swing ($V_{PIX}^+$ to $V_{PIX}^-$) of the display panel. This predetermined voltage $V_{DAC\_COM}$ is programmable by adjusting the input supplied by component 118 from the command parser 44 and can be used to charge the first and the second capacitors (C1, C2) of the common electrode circuit 150*a* alternatively, during a first and second respective phase (as will be described below).

In an embodiment, the low power amplifier 108 may be implemented using a 5 mW operational amplifier, where the pixel voltage $V_{PIX}^+$ is 4.0V and the predetermined voltage $V_{DAC\_COM}$ is 1.5V. The value of the predetermined voltage $V_{DAC\_COM}$ may be selected as a function of the requirements of the liquid crystal material and desired application of the display system (e.g., amplitude and/or phase properties). As such, the range/span and step size of the positive pixel voltage $V_{PIX+}$ and the common electrode voltage $V_{COM}$ may be varied. In some embodiments, the step size of the pixel voltage $V_{PIX}$ and the common electrode voltage $V_{COM}$ may be increased by 2×, eliminating 1 bit from each DAC, as DACs have a range/span and a step size, where the number of bits is log 2 of the range divided by the step size.

In some embodiments, the common electrode circuit 150*a* may use the output voltage of the first low voltage amplifier 108 and the second low voltage amplifier 106 to generate a common electrode voltage $V_{COM}$ based upon the predetermined voltage $V_{DAC\_COM}$ and the pixel electrode voltages $V_{PIX}^+$ and $V_{PIX}^-$. In particular, the control circuit 110 may be coupled to the common electrode circuit 150*a*, wherein, during a first phase, the control circuit 110 can selectively control the common electrode circuit 150*a* to generate a low common voltage $V^-_{COM}$ based upon a negative value of the predetermined voltage $V_{DAC\_COM}$. And the pixel electrode voltage $V_{PIX}^-$. Further, during a second phase, the control circuit 110 may selectively control the common electrode circuit 150*a* to generate a high common voltage $V^+_{COM}$ based upon a sum of the predetermined voltage $V_{DAC\_COM}$ and the pixel voltage $V_{PIX}$.

In particular, the common electrode circuit 150*a* may include a pair of switches (S1 and S2) coupled across a first capacitor C1 to couple the first capacitor C1 across ground and the output of the first amplifier 108 for charging the capacitor C1 to the predetermined voltage $V_{DAC\_COM}$, in some embodiments. In the alternative, the pair of switches (S1 and S2) may couple the first capacitor C1 across the output of the second amplifier 106 and the common electrode node $V_{COM}$ to provide the high or maximum common electrode voltage value ($V^+_{COM}$).

Further, the common electrode circuit 150*a* may include a second pair of switches (S3 and S4) coupled across a second capacitor C2 to couple the second capacitor C2 across ground and the output of the first amplifier 108 for charging the capacitor C2 to the predetermined voltage $V_{DAC\_COM}$. In the alternative, the pair of switches (S3 and S4) may couple the second capacitor C2 across the common electrode node $V_{COM}$ and ground to provide the low common voltage $V^{-COM}$.

In operation, the control circuit 110 provides the control output CS selectively toggles the first and second pair of switches (S1-S4) and provides two phases of operation. In particular, during the first phase, a clocking control output CS from control circuit 110 can toggle the first pair of switches S1 and S2 and couple the first capacitor C1 across ground and the output of the first amplifier 108 to charge the capacitor C1 to the predetermined voltage $V_{DAC\_COM}$. For example, if the predetermined voltage $V_{DAC\_COM}$ is set to 0.8V, the capacitor C1 will be charged to 0.8V. During the first phase, the clocking control output CS from control circuit 110 may, simultaneously, toggle the second pair of switches S3 and S4 to couple the second capacitor C2 across the common electrode node $V_{COM}$ and ground. As a result, the common electrode node $V_{COM}$ is supplied with the low common voltage $V^-_{COM}$, where the voltage is set to $-V_{DAC\_COM}$ when the second capacitor has been initially charged in a previous cycle. Following the same example, the low common voltage $V^-_{COM}$ can be set to −0.8V.

In operation, during the second phase, the clocking control output CS from control circuit 110 can toggle the first pair of switches S1 and S2 to couple the first capacitor C1 across the output of the second amplifier 106 and the common electrode node $V_{COM}$. As a result, the common voltage node is set to the high common voltage $V^+_{COM}$, voltage $V^+_{COM}$ is the sum of the pixel voltage $V_{PIX+}$ and the predetermined voltage $V_{DAC\_COM}$. For example, if the predetermined voltage $V_{DAC\_COM}$ is set to 0.8V, the high common voltage $V^+_{COM}$ will be the sum of $V_{PIX}^+$+0.8V. Simultaneously, during the second phase, the clocking control output CS from control circuit 110 can toggle the second pair of switches S3 and S4 to couple the second capacitor C2 across ground and the output of the first amplifier 108. Accordingly, the second capacitor C2 is charged to the output voltage $V_{DAC\_COM}$ of the first amplifier 108. For example, when the predetermined voltage $V_{DAC\_COM}$ is set to 0.8V, the second capacitor C2 is charged to 0.8 V. In an embodiment, the voltages used to charge C1 and C2 are different, and in an embodiment the voltages used are approximately the same.

In some embodiments, an example of an implementation may include the pixel voltage $V_{PIX+}$ to set to be between and including 2.8 V and 4.336V, where the voltage can be implemented using a 7-bit DAC with a 12 mV step-size. It should be noted that this example is not meant to be limiting to the inventive concept. The range/number of bits and the step size can be larger or smaller. In an embodiment of the present invention, less hardware is utilized and the manufacturing cost of a system or device, in accordance with the present invention, is less when the number of bits utilized is reduced. In an embodiment of the present invention, the voltage $V_{DAC\_COM}$ generated by low voltage amplifier 108 may be, for example, between and including 0.8 V and 2.08V; where the voltage may be implemented using a 7-bit DAC with a 10 mV step-size. Ultimately, the high common electrode voltage $V^+_{COM}$ provided may be from ($V_{PIX+}$+0.8V) to ($V_{PIX}^+$+2.08V), where the voltage can be implemented, for example, using a 7-bit DAC with a 10 mV step-size. Accordingly, the low common electrode voltage $V^-_{COM}$ generated may be from and including −2.08V to −0.8V. However, it should be understood by one of ordinary skill in the art that the number of bits of the DAC, the minimum and maximum values of DAC voltages (range/span) and the step size may vary. It should also be understood by one of ordinary skill in the art that in an embodiment, the operational amplifier 108 may not be coupled to a DAC. These examples are presented to illustrate embodiments of the present invention. However, it should be recognized that the invention is not limited to these examples or embodiments described and can be practiced with modification and alteration within the spirit and scope of the invention.

Referring to FIG. 2B, an embodiment of a (portion of a) common electrode circuit 150*b* that may be used in place of the common electrode circuit 150*a* in the system of FIG. 2A is shown. Note, the associated amplifier of the common electrode circuit **150*b* is not shown. However, one of ordinary skill in the art would understand that an amplifier and associated voltage input component may be provided similarly to what is provided in FIG. 2A. In an embodiment, as shown in FIG. 2B, the pair of switches S1 and S2 may be derived from transistors $T_1$-$T_4$. (example MOSFET transistors). In particular, a plurality of p-type transistors ($T_1$, $T_4$) and a plurality of n-type transistors ($T_2$, $T_3$) may have their gates coupled to receive the clocking control output CS. The control output CS will effectively turn each one of the transistors ($T_1$-$T_4$) ON and OFF. In an embodiment, the source of transistor $T_1$ may be coupled to the voltage pixel node $V_{PIX}$, while the drain of transistor $T_1$ couples to the first capacitor C1**.

Further, the source of the second transistor $T_2$ may couple to ground, while the drain of transistor $T_2$ couples to the capacitor C1. The source of transistor $T_3$ may couple to receive the predetermined voltage (i.e., the output voltage of the first operational amplifier) $V_{DAC\_COM}$, while the source of transistor $T_4$ may couple to the common electrode node $V_{COM}$. Both drains of transistors $T_3$ and $T_4$ may couple to the first capacitor C1, in some embodiments.

Similarly, the pair of switches S3 and S4 may be derived from MOSFET transistors $T_5$-$T_8$. A n-type transistor $T_5$ and a p-type transistor $T_6$ may have their gates coupled to receive the control output CS. The control output CS will effectively turn each one of the transistors ($T_5$, $T_6$) ON and OFF. In some embodiments, the source of transistor $T_5$ may couple to the common electrode node $V_{COM}$, while the drain of transistor $T_5$ couples to the second capacitor C2. Further, the source of the transistor $T_6$ may couple to ground, while the drain of transistor $T_6$ couples to the capacitor C2. The source of transistor $T_7$ may couple to receive the predetermined voltage $V_{DAC\_COM}$, while the source of transistor $T_8$ may couple to ground. Both drains of transistors $T_7$ and $T_8$ may couple to the second capacitor C2, in some embodiments. In some embodiments, each one of the transistor pairs implementing a switch (S1-S4) can be represented by more than one transistor coupled in series (not shown). Note, series transistors form a switch that may share/accommodate a larger voltage.

In operation, during a first phase when the control output is high, all of the n-type transistors $T_2$, $T_3$, $T_5$, and $T_8$ turn ON. As will be described in more detail below, the result of these transistors turning on leads to connecting the first capacitor C1 across ground and the predetermined voltage $V_{DAC\_COM}$, while the second capacitor C2 is coupled across the common electrode node $V_{COM}$ and ground. During the second phase when the control output is low, the p-type transistors ($T_1$, $T_4$, $T_6$, and $T_7$) turn ON. As a result, the first capacitor C1 is coupled across the pixel voltage node $V_{PIX}$ and the common electrode node $V_{COM}$, while the second capacitor C2 is coupled across ground and the predetermined voltage $V_{DAC\_COM}$.

During the second phase when the control output CS is low, the p-type transistor $T_1$ will turn ON, effectively connecting the circuit from the pixel voltage node $V_{PIX+}$ to the first capacitor C1. Simultaneously, when the Control output CS is low, the n-type transistor $T_2$ to will turn OFF, effectively opening the circuit from the node connecting the drain a transistor $T_2$ to ground. That is, when the control output CS is low, the capacitor $C_1$ will be coupled to the node having the pixel voltage $V_{PIX}$.

In the alternative during the first phase when the control output CS is high, the p-type transistor $T_1$ will turn OFF, effectively opening the circuit between the node containing the pixel voltage and the drain of the first Transistor $T_1$. Simultaneously, as a result of a high control output CS, the n type transistor $T_2$ will turn ON, effectively coupling the drain of transistor $T_2$ to ground. That is, when the control output CS is high, the capacitor C1 will be coupled to ground. Thereby, the switch implementation using the MOSFET transistors effectively couples the first capacitor C1 to either ground/$V_{PIX-}$ or the pixel voltage node $V_{PIX}$.

For the second switch S2, the implementation using MOSFET transistors is reversed. Switch S2 is implemented using an n-type transistor $T_3$ and a p-type transistor $T_4$, where the gates of the transistors couple to clocking control output CS to turn these transistors ON and OFF. In particular as noted above, the source of the n-type transistor $T_3$ couples to the output of the first amplifier 108, while the source of the p-type transistor $T_4$ couples to the common electrode node $V_{COM}$. Both drains of transistors $T_3$ and $T_4$ couple to the first capacitor C1. In operation, during the second phase when the control output CS is low, the n-type transistor 13 will turn OFF, effectively opening the circuit from the output of the first amplifier 108 to the first capacitor $C_1$. Simultaneously, when the control output CS is low, the p-type transistor $T_4$ to will turn ON, effectively shorting the circuit from the node connecting the capacitor C1 and the common electrode node $V_{COM}$. That is, when the control output CS is low, the capacitor C1 will be coupled to the common electrode node $V_{COM}$.

In the alternative, during the first phase when the control output CS is high, the n-type transistor $T_3$ will turn ON, effectively shorting the circuit between the output node of amplifier 108 and the capacitor C1, thereby coupling capacitor C1 to the predetermined voltage $V_{DAC\_COM}$. Simultaneously, as a result of a high control output CS, the p-type transistor $T_4$ will turn OFF, effectively opening the circuit between the drain of transistor $T_4$ to the common electrode node $V_{COM}$. That is, when the control output CS is high, the capacitor C1 will be coupled to receive the predetermined voltage $V_{DAC\_COM}$. Thereby, the switch implementation for switches S1 and S2 using the MOSFET transistors ($T_1$-$T_4$) effectively couples the first capacitor to either across the pixel voltage node and the common electrode node $V_{COM}$ or across ground and the node having the predetermined voltage $V_{DAC\_COM}$.

Similarly, the pair of switches S3 and S4 may be derived from MOSFET transistors $T_5$-$T_8$. During the second phase when the control output CS is low, the transistors $T_5$-$T_8$ will switch ON and OFF to couple the capacitor C2 across ground and the output node having predetermined voltage $V_{DAC\_COM}$, effectively charging capacitor C2 to the predetermined voltage $V_{DAC\_COM}$. Conversely, during the first phase when the control output CS is high, the switch transistors $T_5$-$T_8$ will switch from ON to OFF to couple the capacitor C2 across the common electrode node $V_{COM}$ and ground, applying the negative value of the predetermined voltage $V_{DAC\_COM}$ at the common electrode node $V_{COM}$ (as explained in detail with reference to FIG. 2A).

In an embodiment, the implementation of MOSFET transistors ($T_1$-$T_8$) as switches ($S_1$-$S_4$) has the benefit and advantage of reducing the overhead voltage required. In a conventional implementation however, it takes approximately +/−1V of extra supply voltage above and below $V^+_{COM}$ and $V^-_{COM}$, respectively. It is noted that the supply voltage may be selected to ensure correct operation for all possible supply voltage values. Further, in an embodiment of the present invention, the maximum voltage any one of switch transistors S1-S4 experiences appears to be about or equal to 6V or 7V for $V_{COM}$=−1V to 5V or −1.5V to 5.5V, respectively. Additionally, negative voltage $V^{-}_{COM}$ can be approximately −1.5V, which requires that switch transistors S1-S4 (e.g., digital transistors) are isolated from ground and that they are also isolated from −1.5V as well.

A display system (e.g., system 100), in accordance with the present invention, for generating a common electrode voltage $V_{COM}$, lowering the required breakdown voltage of the transistors used to implement the common electrode voltage $V_{COM}$ and lowers the power dissipation of the common electrode voltage $V_{COM}$ circuitry. The lower breakdown voltage effectively reduces the die area because the transistors are smaller. Additionally, the lower breakdown voltage may allow the integration of common electrode voltage $V_{COM}$ on a future scaled node for size, power, and/or cost savings.

In a known system, the breakdown voltage of the common electrode voltage $V_{COM}$ transistors of a common electrode circuit is 20V, and the power dissipation of the $V_{COM}$ amplifier is 20-30 mW. However, the system, circuits and methods of high ($V^{+}_{COM}$) and low ($V^{-}_{COM}$) common electrode voltage generation disclosed herein have the benefit and advantage of using a lower voltage amplifier (e.g., amplifier 108), that can be employed to create the common electrode voltage $V_{COM}$ by establishing the voltages on the first and second capacitors ($C_1$, $C_2$), which get connected either to ground (or $V_{PIX}^{-}$) for the low common electrode voltage $V^{-}_{COM}$ or to the pixel voltage $V_{PIX+}$ for the high common electrode voltage $V^{+}_{COM}$. In an embodiment, the lower voltage amplifier 108 may have an output value in the range of e.g., 0V-1.6V. In an embodiment, the supply voltage for the amplifier 108 to create such a lower voltage may be in the range of e.g., 3.3.-5V. Accordingly, during operation, one of the capacitors ($C_1$, $C_2$) may establish either high common electrode voltage $V^{+}_{COM}$ or the low common electrode voltage $V^{-}_{COM}$, while the other is being charged and/or replenished. Accordingly, the charging of the capacitors are swapped/switched/changed using switches S1-S4. Amplifier 108

As an added benefit, the common electrode circuits (e.g., 150*a*, 150*b*, 250) of the embodiments of the display systems (e.g. system 100, 200) generates the common electrode voltage $V_{COM}$ and requires a reduced power supply (e.g., approximately 5V) in comparison to the conventional displays that require a large power supply (e.g., approximately 9-10V). In addition, in an embodiment of the present invention, amplifier 108 operates at a lower current of approximately ~1 mA (versus ~2-3 mA on conventional systems) and is capable of lowering the power from, for example, about 20-30 mW to approximately 5 mW. A further benefit of this system and method of common electrode voltage generation disclosed herein is that it reduces or eliminates the need for an external power supply voltage and their associated regulator circuitry. As a result, the cost for a device application and/or display system in accordance with the present invention, is lowered; and the size/area and power are reduced.

In some embodiments, because of charge sharing between the first and second capacitors (C1, C2) and the common $V_{COM}$ capacitance, capacitors C1 and C2 may be approximately, between and including, 0.1 uF to 10 uF in value. In an embodiment of the present invention, capacitors C1 and C2 may be approximately 1 uF in value. This may result in the deviation of the common electrode voltage $V_{COM}$ from its programmed/desired voltage of about 5-10 mV. In some embodiments, this result may be ignored if sufficiently small. In other embodiments, the effect of this result can be reduced by using larger capacitors to implement capacitors C1 and C2, for example, C1 and C2 may have between and including 2-5 uF. In an embodiment of the present invention, the $V_{COM}$ deviation may be compensated for by programming the voltage on the capacitors (C1, C2) to be somewhat larger or smaller than the final desired value of the common electrode voltage $V_{COM}$, for example, by 1-10 mV.

The foregoing example shown in FIG. 2B has been presented for the purpose of explanation. It is not intended to be exhaustive or to limit the systems and methods to the precise forms disclosed herein. It is understood by those skilled in the art that depending upon the exact voltage that is desired for charging one or more of the capacitors, the type of transistor and the voltage swing required (as well as the connection of the body of the transistor) must be carefully selected for the circuit to be operational. The details of the final implementation of the switches S1-S4 and their corresponding clocked control outputs CS, along with the gate voltages on the various switch transistors, can be different or chosen in a specific way to improve functionality or operation of the circuit.

Figure 2D:
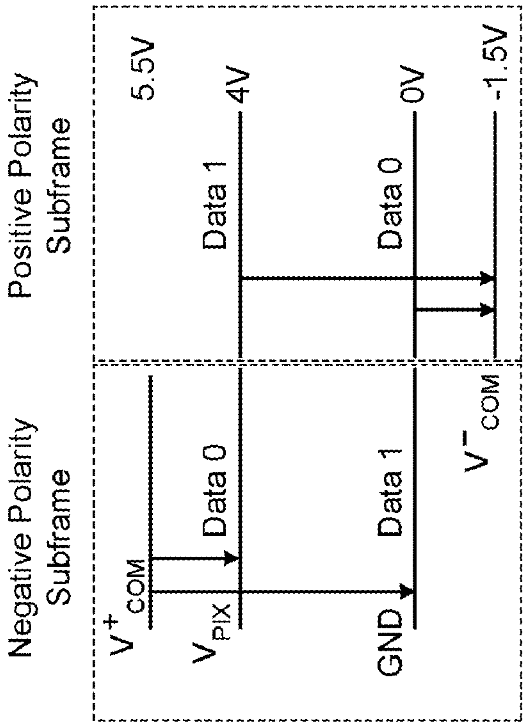
FIG. 2D is a voltage and data diagram showing voltage comparison between the pixel voltage $V_{PIX}$ and the common electrode voltage $V_{COM}$, according to an embodiment of the present invention.
Figure 2C:
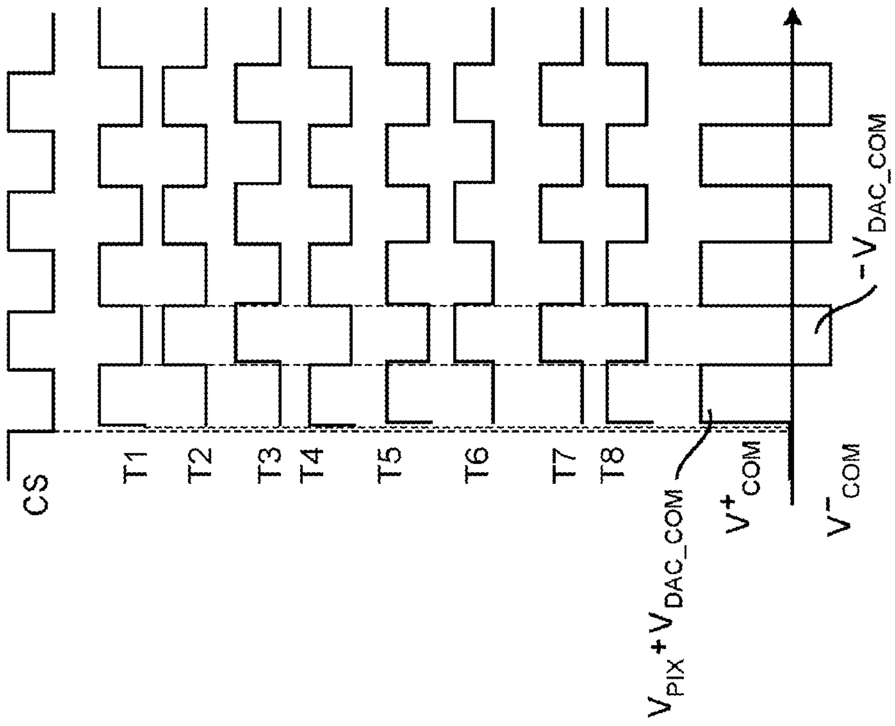
FIG. 2C is a timing diagram illustrating an operational example of the common electrode circuit depicted in FIG. 2B, according to an embodiment of the present invention.

Referring to FIG. 2C, a timing diagram illustrating an operational example of the circuit depicted in FIG. 2B in some embodiments is shown. As is noted with FIG. 2B above, when the control output CS is high, p-type transistors $T_1$, $T_4$, $T_6$, and $T_7$ are OFF, while the n-type transistors $T_2$, $T_3$, $T_5$, and $T_8$ are ON. This means that during the first phase switches S1 and S2 shift to couple the first capacitor C1 between the predetermined node and ground, effectively charging the first capacitor to the predetermined voltage $V_{DAC\_COM}$. At the same time, switches S3 and S4 couple the second capacitor C2 across the common electrode node $V_{COM}$ and ground. As shown the voltage at the common electrode node will be the negative value of the predetermined voltage $V_{DAC\_COM}$.

In the alternative, when the control output CS is low during the second phase, p-type transistors $T_1$, $T_4$, $T_6$, $T_7$ are ON, while the n-type transistors $T_2$, $T_3$, $T_5$, and $T_8$ are OFF. This means that during the second phase switches S1 and S2 toggle to couple the first capacitor $C_1$ between the pixel voltage node $V_{PIX}$ and the common electrode node $V_{COM}$, effectively supplying a voltage sum of the pixel voltage $V_{PIX}$ and the predetermined voltage $V_{DAC\_COM}$ at the common electrode node $V_{COM}$. At the same time, switches S3 and S4 couple the second capacitor $C_2$ across ground and output node having the predetermined voltage $V_{DAC\_COM}$, effectively charging the second capacitor C2 to the predetermined voltage $V_{DAC\_COM}$. Accordingly, during this second phase, the voltage at common electrode node $V_{COM}$ is equal to the sum the pixel voltage $V_{PIX}$ and the predetermined voltage $V_{DAC\_COM}$ As shown in the timing diagram of FIG. 2C.

Referring to FIG. 2D, a voltage and data diagram showing voltage comparison between the pixel voltage $V_{PIX}$ and the common electrode voltage $V_{COM}$, in some embodiments is provided. As shown, the high common electrode voltage $V^{+}_{COM}$ can be set to a voltage that is greater than the pixel voltage $V_{PIX}$. Intermittently, the voltage at the common electrode may be switched to a low common electrode voltage $V^{-}_{COM}$, which can be set to a voltage that is less than ground or $V_{PIX-}$ by the same amount. In this particular example, where the pixel voltage $V_{PIX}$ is 4V, the high common electrode voltage $V^{+}_{COM}$ may be set to 5.5V and the low common electrode voltage $V^{-}_{COM}$ may be set to −1.5V. In some embodiments, the voltages shown can be shifted more positive or more negative, depending upon the implementation and the application. For example, the pixel voltage $V_{PIX+}$ may be 1.2V and the ground voltage ($V_{PIX-}$)

may be −2.8V, where the difference is 4V. In some embodiments, a 50% duty cycle exists.

A preferred voltage difference between the common electrode voltage $V_{COM}$ and the pixel voltage $V_{PIX}$ can be close to zero, in some embodiments. Alternatively, the pixel voltage $V_{PIX}$ can be 1.5V to 4.5V, possessing a non-uniform duty cycle for color sequential (time multiplexed applications), such as the Red Green Blue (RGB) color model. In an embodiment of the present invention, the polarities of the voltages may be inverted. In an embodiment of the present invention, the power supply may be, for example, $V_{dd}$ and function as a positive ground, and the $V_{PIX}$ may have a negative voltage value. For example, in an embodiment of the present invention, $V_{dd}$ is 1.2 V and $V_{PIX}$ is −2.8 V. It should be understood by one of ordinary skill in the art that the voltage values may vary.

Referring to FIG. 3, a circuit diagram of a second embodiment of the circuit for common electrode voltage generation, in accordance with some embodiments is provided. The system 200 includes a control circuit 210, a common electrode circuit 250 having a first low voltage amplifier 208, and a second low voltage amplifier 206, and an LCoS display/panel/imager 280. Low voltage, as referred to here, may be, for example, approximately 5V or less. Amplifier 208 is connected to a component 218 (e.g., a DAC) for supplying a predetermined/preselected voltage to achieve a desired output voltage $V_{DAC\_COM}$. Similarly, component 216 (e.g., a DAC) is coupled to amplifier 206 for supplying a predetermined/preselected voltage in order to achieve a desired output voltage $V_{PIX+}$.

As similarly discussed with respect to FIG. 2A, the command parser 44 supplies inputs to components 218, 216 and control circuit 210 as follows. More specifically, in an embodiment, the command parser 44 provides individual voltage inputs to components 216 and 218 as well as control circuit 210. These voltage inputs are digital control outputs (i.e., voltages, logic levels). The voltage input supplied by the command parser 44 to component 216 (e.g., DAC) represents a digital word corresponding to the desired input voltage to amplifier 206. The output of component 216 is input to and amplified by amplifier 106 and produces voltage $V_{PIX+}$.

The voltage input supplied by the command parser 44 to component 218 (e.g. DAC) represents a digital word corresponding to the required input voltage to amplifier 208. The output of component 218 is amplified by amplifier 208 and produces $V_{DAC\_COM}$. The voltage input supplied by the command parser 44 to the control circuit 210 represents one or more logic level inputs that establish the frequency, duty cycle and phase of control output CS. The output of the control circuit 210 is control output CS.

Similar to the first embodiment, the control circuit 210 may include an arrangement including a flip-flop device 212 coupled to provide at least one clocking control output CS. In some embodiments, the control circuit 210 may include a flip-flop 212 coupled to a buffer 214 to provide a first and second clocking control output, wherein the second clocking control output is delayed with respect to the first such that the timing for the turning the transistors ON and OFF overlaps during a first and second phase. The second low voltage amplifier 206 may be used for generation of the pixel voltage $V_{PIX}$, while the first low voltage amplifier 208 may be used to generate a predetermined voltage $V_{DAC\_COM}$ that is relatively small in comparison to the pixel voltage $V_{PIX}$ of the LCoS display panel 280. For example, the low power amplifier 208 may be implemented using a 1-5 mW operational amplifier, where the pixel voltage $V_{PIX}$ is 4.0V and the predetermined voltage $V_{DAC\_COM}$ is 1.6V.

In some embodiments, the common electrode circuit 250 may use the output voltage of the first low voltage amplifier 208 and the second low voltage amplifier 206 to generate a common electrode voltage $V_{COM}$ based upon the predetermined voltage $V_{DAC\_COM}$ and the pixel voltage $V_{PIX}$. In particular, a control circuit 210 may be coupled to the common electrode circuit 250, wherein, during a first phase, the control circuit 210 can selectively control the common electrode circuit 250 to generate a low common voltage $V^{-}_{COM}$ based upon a negative value of a voltage determined by the voltage divider network implemented using resistors $R_1$, $R_2$, and $R_{DAC}$, where resistor $R_{DAC}$ is a variable resistor that can be used to add a predetermined offset. Further, during a second phase, the control circuit 210 may selectively control the common electrode circuit 250 to generate a high common voltage $V^{+}_{COM}$ based upon a sum of the predetermined voltage $V_{DAC\_COM}$, the pixel voltage $V_{PIX}$, and the voltage from the voltage divider network of resistors $R_1$, $R_2$, and $R_{DAC}$ In some embodiments, the common electrode circuit 250 may include a pair of switches (S5 and S6) coupled across a first capacitor C3 to couple the first capacitor C3 across ground and the output of the first amplifier 208. In the alternative, the pair of switches (S5 and S6) may couple the first capacitor C3 across the output of the second amplifier 206 and the common electrode node $V_{COMPP}$. Further, the common electrode circuit 250 may include another switch S7 coupled across the common electrode node $V_{COMPP}$ and ground. As noted above, the variable resistor $R_{DAC}$ may be used to offset the DAC for mismatch and/or DBR/work function. In particular, the resistors $R_1$, $R_2$, and $R_{DAC}$ implement a voltage divider network, where the common electrode voltage $V_{COM}$ may be approximately $(V_{PIX}/2)(1\pm\alpha)$, where $\alpha$ represents an adjustment for offset correction added using the variable resistor $R_{DAC}$.

In operation, the control circuit 210 provides a clocked control output CS that selectively toggles switches S5-S7 to provide two phases of operation. In particular, during the first phase, a control output CS from control circuit 210 can toggle the first pair of switches S5 and S6 to couple the first capacitor C3 across ground and the output of the first amplifier 208 to charge the capacitor C3 to the predetermined voltage $V_{DAC\_COM}$. For example, if the predetermined voltage $V_{DAC\_COM}$ is set to 1.6V, the capacitor will be charged to 1.6V. Simultaneously during the first phase, the control output CS from control circuit 210 can toggle switch S7 to couple the second capacitor C4 across the common electrode node $V_{COM}$ and ground. As a result, the common electrode node $V_{COM}$ is supplied with charged voltage of the second capacitor C4, which is the voltage supplied by the voltage divider network of resistors $R_1$, $R_2$, and $R_{DAC}$.

During the second phase, the control output CS from control circuit 210 can toggle the first pair of switches S5 and S6 to couple the first capacitor C3 across the output of the second amplifier 206 ($V_{PIX}$) and the preliminary common electrode node $V_{COMPP}$. As a result, the preliminary common voltage node $V_{COMPP}$ is set to the high common voltage $V^{+}_{COM}$, where the voltage $V^{+}_{COM}$ is the sum of voltages $V_{PIX}$ and $V_{DAC\_COM}$.

Simultaneously, during the second phase, the clocking control output CS from control circuit 210 can toggle switch S7 to open the circuit, effectively setting the common electrode voltage node $V_{COM}$ to be set to the sum of the voltages at the preliminary common voltage node $V_{COMPP}$ and the voltage supplied by the voltage divider network of resistors $R_1$, $R_2$, and $R_{DAC}$, which is approximately $(V_{PIX}/2)(1\pm\alpha)$.

Referring to FIG. 3, in an embodiment, for example, the pixel voltage $V_{PIX+}$ may be between 2.8 V and 4.336V, where the voltage can be implemented using a 7-bit DAC with a 12 mV step-size. The voltage $V_{DAC\_COM}$ generated by low voltage amplifier 208 may be between 1.6V and 4.16V in this example; where the voltage $V_{DAC\_COM}$ may be implemented using a 6-bit DAC. Ultimately, the common electrode voltage $V_{COMPP}$ provided may be from ($V_{PIX}$+1.6V) to ($V_{PIX}$+4.16V), where the voltage $V_{COMPP}$ can be implemented using a 6-bit DAC with a 40 mV step-size. These examples are presented for further explanation of the inventive concept. It should be recognized that the invention is not limited to these examples or embodiments described and can be practiced with modification and alteration within the spirit and scope of the inventive concept.

Referring again to FIG. 3, in an embodiment, this implementation may avoid the requirement for isolation from a negative supply voltage, which may be more suitable for bulk silicon. A negative supply voltage is avoided because of the function of capacitor C4, which acts as a blocking capacitor. Voltage $V_{PIX}^-$ is constrained to be equal to or greater than zero. The voltage swing $V_{COMPP}$ is established in the circuit 250 to vary from $V_{PIX}^-$ and $V_{PIX}^+ + V_{DAC\_COM}$ Further, the DC average value of $V_{COM}$ is constrained to be $(V_{PIX}^+ - V_{PIX-})/2$ (note: alpha (α)=0). DC blocking capacitor C4 allows $V_{COM}$ to go more negative than $V_{PIX-}$. The voltage swing on $V_{COM}$ varies between $(V_{PIX}^- - (V_{DAC\_COM}/2))$ and $(V_{PIX+} + (V_{DAC\_COM}/2))$. Note, here, $V_{DAC\_COM}$ is programmed to be a positive voltage (typically 1-4V), which is approximately twice the value required in the implementation provided in FIG. 2A.

In an embodiment, the common electrode circuit 250 of the system 200 may pre-charge lower capacitor C4 to approximately $-V_{DAC\_COM}/2$. In the alternative, additional resistors (not shown) may be used to feed the lower capacitor C4 the common electrode voltage $V_{COM}$ to increase the discharging time constant and reduce $V_{COM}$ drop. In an embodiment, e.g., as illustrated in FIGS. 2A, $V_{PIX}^-$ (is zero, and $V_{COM}$ switches between less than zero and greater than $V_{PIX}^+$.

Figure 4:
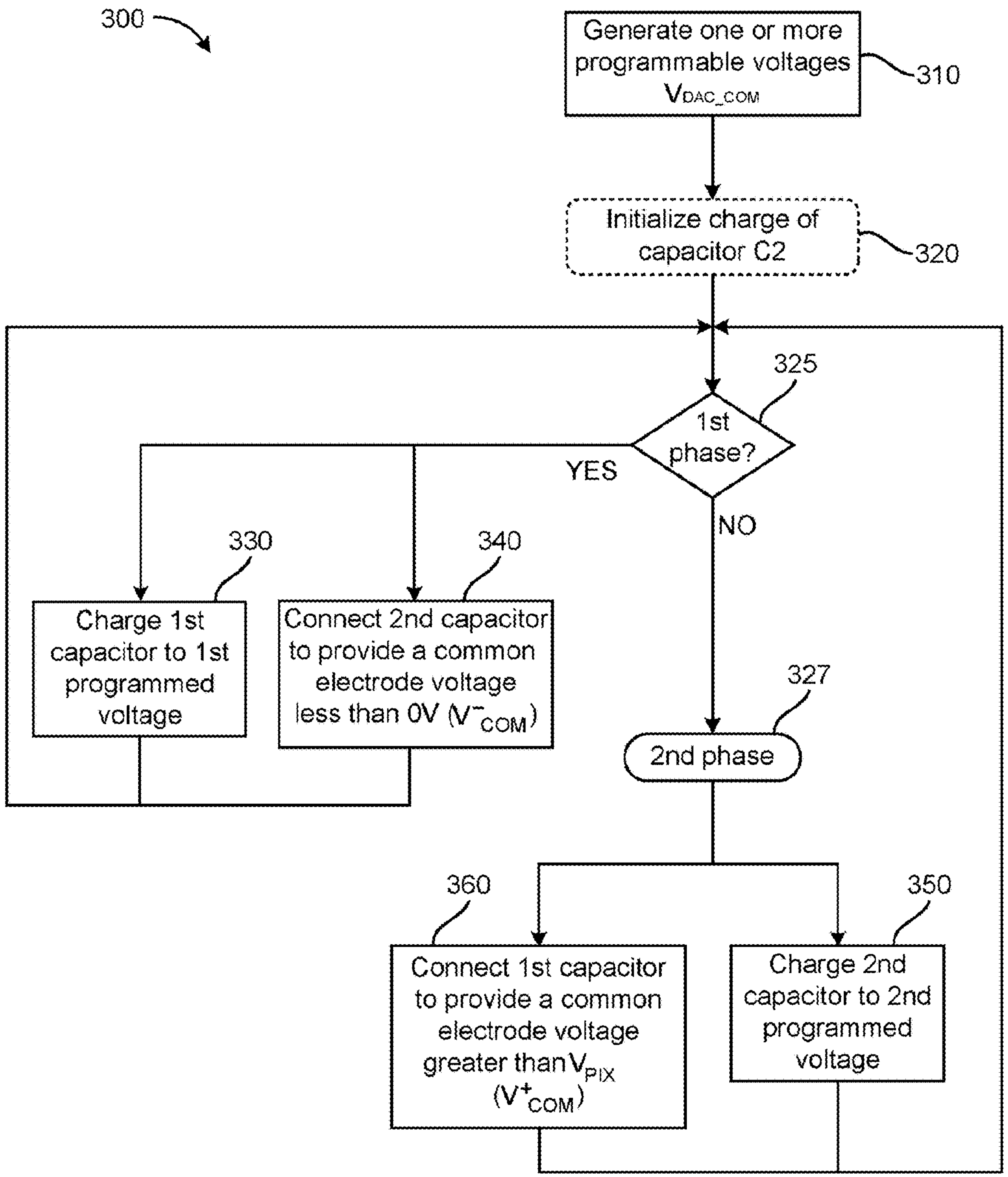
FIG. 4 is a flow diagram of a method for generating the common electrode voltage $V_{COM}$, according to an embodiment of the present invention.

Referring to FIG. 4, an exemplary flow diagram of a method 300 for generating the common electrode voltage in accordance with some embodiments is provided. In a first action 310, the method 300 includes generating one or more predetermined (programmed) voltages $V_{DAC\_COM}$ for programming the first and second capacitors (C1, C2). For example, an operational amplifier arrangement may generate a first programmed voltage $V_{DAC\_COM}$, while another operational amplifier arrangement may provide generate a pixel voltage $V_{PIX}$ corresponding to the LCoS display panel requirement. The method 300 may include initially charging the first capacitor C1 with the predetermined voltage in an action 320. For example, capacitor C2 may be programmed initially to the first pre-determined voltage $V_{DAC\_COM}$.

In a decision action 325, a determination is made with regards to whether the process has entered the first phase. For example, a control circuit may send control outputs to toggle select switches in an arrangement coupling the capacitors across specific nodes for a first phase operation. If the first phase has entered, in an action 330 the method 300 includes charging the first capacitor to the predetermined voltage. For example, the first capacitor C1 may be charged to the predetermined voltage $V_{DAC\_COM}$.

Additionally, the method 300 may include coupling the second capacitor across ground GND and the common electrode $V_{COM}$ to produce a common electrode voltage less than 0 V ($V^-_{COM}$), in an action 340. If the method 300 is not in the first phase, in an action 327 it is a known determination that the process has entered the second phase. When the second phase has been entered, in an action 350 the method 300 may include charging the second capacitor to the predetermined voltage. Additionally, the method 300 may include coupling the first capacitor across the pixel voltage node $V_{PIX}$ and the common electrode $V_{COM}$ to produce a common electrode voltage greater than the pixel voltage ($V^+_{COM}$), in an action 360. At the end of actions 330, 340, 350, and 360, the process loops back to the decision action 325 in an effort to intermittently charge and connect the capacitors to provide at the common electrode node the high common electrode voltage $V^+_{COM}$ and the low common electrode voltage $V^-_{COM}$ during the two respective phases.

The foregoing description, for the purpose of explanation, has been described with reference to specific embodiments. However, the illustrative discussions above are not intended to be exhaustive or to limit the systems and methods to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein and may be modified within the scope and equivalents of the appended claims.

Particularly in the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Further, many other embodiments can be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the disclosure. Embodiments maybe embodied in many alternate forms and should not be construed as limited to only the embodiments set forth herein. Accordingly, the specification and drawings are to be regarded in an illustrative sense rather than a restrictive sense.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "I" symbol includes any and all combinations of one or more of the associated listed items. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. Further, although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" perform a task or tasks. In such contexts, the phrase "configured to" is used to so connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware; for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

What is claimed is:

1. A display system, comprising:
a display panel including a plurality of pixels, each of the plurality of pixels having:
a pixel electrode; and
a common electrode electrically coupled to a common electrode node; and
a digital drive device including a common electrode circuit coupled to the common electrode node, the common electrode circuit being configured to vary the common electrode voltage to maintain a voltage balance across the display panel.

2. The display system of claim 1, wherein the common electrode circuit is configured to:
generate a predetermined voltage; and
switch the common electrode voltage between:
a first voltage that is equal to a first pixel voltage of the pixel electrode minus the predetermined voltage; and
a second voltage that is equal to a second pixel voltage of the pixel electrode plus the predetermined voltage.

3. The display system of claim 2, wherein the common electrode circuit comprises:
a first capacitive element having a first node and a second node;
a first switch circuit configured, in response to a clock signal, to switch the first node of the first capacitive element between a node configured to receive the second pixel voltage and a node configured to receive the first pixel voltage;
a second switch circuit configured, in response to the clock signal, to switch the second node of the first capacitive element between a node configured to receive the predetermined voltage and the common electrode node;
a second capacitive element having a first node and a second node;
a third switch circuit configured, in response to the clock signal, to switch the first node of the second capacitive element between a node configured to receive the first pixel voltage and a node configured to receive the predetermined voltage; and
a fourth switch circuit configured, in response to the clock signal, to switch the second node of the second capacitive element between a node configured to receive the first pixel voltage and the common electrode node.

4. The display system of claim 3, wherein each of the first and second capacitive elements comprises a single capacitor.

5. The display system of claim 3, wherein:
each of the switch circuits comprises a series connected pair of complementary field effect transistors; and
each of the complementary field effect transistors including a control node configured to receive the clock signal,
an output node being formed at the interconnection of the pair of complementary field effect transistors and the output node coupled to the first or second node of the corresponding one of the first and second capacitive elements.

6. The display system of claim 2, wherein the second pixel voltage of the pixel electrode has a value in the range of 1.2V to 4V, and the first pixel voltage of the pixel electrode has a value in the range of 0V to −2.8V.

7. The display system of claim 2, wherein the predetermined voltage has a value in the range of 0-2V.

8. The display system of claim 1, wherein the common electrode circuit comprises a voltage divider configured to generate an offset voltage, the common electrode circuit configured to generate during a first phase a low common voltage for the first voltage based on the value of the offset voltage, and configured to generate during a second phase a high common voltage for the second voltage equal to a sum of the offset voltage, a predetermined voltage, and a maximum pixel voltage of the pixel electrode.

9. The display system of claim 1, wherein the digital drive device further comprises a bit plane memory storing bit-plane values that determine a pixel electrode voltage to be applied to the pixel electrode of each of the plurality of pixels, the digital drive device configured to control the pixel electrode voltage of each pixel to switch between a maximum pixel voltage and a minimum pixel voltage based upon a corresponding bit-plane value for the pixel.

10. The display system of claim 1, wherein the display panel comprises a spatial light modulator.

11. The display system of claim 10, wherein the spatial light modulator comprises a liquid crystal display panel.

12. The display system of claim 11, wherein the liquid crystal display panel comprises an LCOS display.

13. The display system of claim 1, wherein the common electrode circuit and the display panel are formed in a same integrated circuit.

14. A display system for displaying an image comprising:
a display panel having a plurality of pixels, each of the plurality of pixels having a pixel electrode and a common electrode; and a digital drive device configured to:

apply a pixel voltage to a pixel electrode of a pixel of the plurality of pixels; and vary a common electrode voltage supplied on the common electrode to maintain a voltage balance across the display panel.

15. The display system of claim 14, wherein the display panel comprises a spatial light modulator.

16. The display system of claim 15, wherein the spatial light modulator comprises an LCOS display.

17. A method, comprising:

applying a pixel voltage to a pixel electrode of a pixel of a plurality of pixels of a display panel, each of the plurality of pixels further including a common electrode; and controlling a common electrode circuit to vary a common electrode voltage supplied on the common electrode to maintain a voltage balance across the display panel.

18. The method of claim 17, wherein controlling the common electrode circuit further comprises controlling switching of a plurality of capacitive elements to vary the common electrode voltage between a first voltage that is equal to a first pixel voltage of the pixel electrode minus a predetermined voltage and between a second voltage that is equal to a second pixel voltage of the pixel electrode plus the predetermined voltage.

19. The method of claim 18, wherein controlling switching of the plurality of capacitive elements comprises:

during a first phase of operation:

coupling a first one of the plurality of capacitive elements between a node configured to receive the first pixel voltage and a node configured to receive the predetermined voltage; and coupling a second one of the plurality of capacitive elements between the node configured to receive the first pixel voltage and the common electrode.

20. The method of claim 19, wherein controlling switching of the plurality of capacitive elements comprises:

during a second of phase of operation:

coupling the first one of the plurality of capacitive elements between a node configured to receive the second pixel voltage and the common electrode; and coupling the second one of the plurality of capacitive elements between the node configured to receive the first pixel voltage and the node configured to receive the predetermined voltage.

* * * * *